United States Patent
Lagasse et al.

(10) Patent No.: US 8,763,403 B2
(45) Date of Patent: Jul. 1, 2014

(54) METHOD FOR USE WITH ANNULAR GAS TURBINE ENGINE COMPONENT

(75) Inventors: Leo J. Lagasse, Wells, ME (US); Richard M. Gregoire, Wells, ME (US); George H. Reynolds, Sanford, ME (US)

(73) Assignee: United Technologies Corporation, Hartford, CT (US)

( * ) Notice: Subject to any disclaimer, the term of this patent is extended or adjusted under 35 U.S.C. 154(b) by 894 days.

(21) Appl. No.: 12/950,476

(22) Filed: Nov. 19, 2010

(65) Prior Publication Data
US 2012/0125011 A1   May 24, 2012

(51) Int. Cl.
*F02C 1/00* (2006.01)

(52) U.S. Cl.
USPC .................................. 60/772; 29/800; 60/98

(58) Field of Classification Search
CPC ............. F23R 3/60; F23R 2900/00012; F01D 11/001; F01D 11/025; F01D 11/02
USPC ........... 60/772, 796, 798, 799, 800, 805, 783; 29/402.03, 426.3, 700, 800; 277/412, 277/413
See application file for complete search history.

(56) References Cited

U.S. PATENT DOCUMENTS

| | | | |
|---|---|---|---|
| 2,579,583 A | 12/1951 | Johnson | |
| 3,182,955 A | 5/1965 | Hyde | |
| 3,724,059 A * | 4/1973 | Celovsky | ..................... 29/426.1 |
| 3,797,085 A | 3/1974 | Aartman | |
| 3,802,046 A | 4/1974 | Wachtell et al. | |
| 4,176,433 A | 12/1979 | Lee et al. | |
| 4,194,869 A | 3/1980 | Corcokios | |
| 4,305,697 A | 12/1981 | Cohen et al. | |
| 4,326,833 A | 4/1982 | Zelahy et al. | |
| 4,567,649 A * | 2/1986 | Ades et al. | ..................... 29/800 |
| 5,269,057 A | 12/1993 | Mendham | |
| 5,444,911 A | 8/1995 | Goodwater et al. | |
| 5,690,469 A | 11/1997 | Deal et al. | |
| 5,758,416 A | 6/1998 | Reverman et al. | |
| 5,797,725 A | 8/1998 | Rhodes | |
| 6,154,959 A | 12/2000 | Goodwater et al. | |
| 6,173,491 B1 | 1/2001 | Goodwater et al. | |
| 6,179,560 B1 | 1/2001 | Kouris et al. | |
| 6,375,415 B1 | 4/2002 | Burdgick | |
| 6,394,750 B1 | 5/2002 | Hiskes | |
| 6,416,278 B1 | 7/2002 | Caddell, Jr. et al. | |
| 6,450,763 B1 | 9/2002 | Crum et al. | |
| 6,685,431 B2 | 2/2004 | Hiskes | |
| 6,785,961 B1 | 9/2004 | Caddell, Jr. et al. | |
| 6,793,457 B2 | 9/2004 | Caddell et al. | |
| 6,892,931 B2 | 5/2005 | Steplewski et al. | |
| 6,905,308 B2 | 6/2005 | Hagle et al. | |
| 7,101,150 B2 | 9/2006 | Bash et al. | |
| RE39,479 E | 1/2007 | Tressler et al. | |

(Continued)

*Primary Examiner* — Phutthiwat Wongwian
*Assistant Examiner* — Alain Chau
(74) *Attorney, Agent, or Firm* — Kinney & Lange, P.A.

(57) ABSTRACT

A method is provided for use with an annular gas turbine engine component that includes a main body and an annular seal engaged to the main body with an interference fit. The method includes rotating the annular gas turbine engine component, directing thermal energy from a heat source at the annular seal to thermally expand the annular seal relative to the main body while the annular gas turbine engine component rotates, removing the heated annular seal from the main body, providing a newly manufactured replacement detail having substantially the same configuration as the main body, and engaging the removed annular seal to the replacement detail with an interference fit.

20 Claims, 3 Drawing Sheets

(56) References Cited

U.S. PATENT DOCUMENTS

| | | |
|---|---|---|
| 7,238,003 B2 | 7/2007 | Synnott et al. |
| 7,798,773 B2 | 9/2010 | Pellet et al. |
| 2003/0106215 A1 | 6/2003 | Heyward et al. |
| 2008/0101927 A1 | 5/2008 | Strain et al. |
| 2008/0289179 A1 | 11/2008 | Pellet et al. |
| 2009/0214335 A1 | 8/2009 | Long |
| 2010/0181366 A1 | 7/2010 | Anantharaman |

* cited by examiner

METHOD FOR USE WITH ANNULAR GAS TURBINE ENGINE COMPONENT

BACKGROUND

The present invention relates to methods of disassembling and assembling gas turbine engine components, and more particularly annular gas turbine engine components.

Components of gas turbine engines may become worn or damages after use. For example, annular components such as turbine vane support rings may develop cracks or other wear or damage that necessitates repair or replacement. Repair is generally more cost-effective than full-part replacement. However, repairs to annular components can be difficult or impossible using known methods. For example, typical repairs to a first stage high pressure turbine vane support ring for a PW4000 gas turbine engine can require repair source approval (RSA) with actual engine run hardware cut-ups (a time consuming and expensive process), elevated welding/brazing temperatures can produce part distortion (rendering that part non-repairable), and repair processes can utilize acidic and/or environmentally unfriendly processes (e.g., nickel plating). In addition, known repair processes may have repair limits, such as plasma flange repairs that can render a component non-repairable after the process is performed twice.

SUMMARY

A method is provided according to the present invention for use with an annular gas turbine engine component that includes a main body and an annular seal engaged to the main body with an interference fit. The method includes rotating the annular gas turbine engine component, directing thermal energy from a heat source at the annular seal to thermally expand the annular seal relative to the main body while the annular gas turbine engine component rotates, removing the heated annular seal from the main body, providing a newly manufactured replacement detail having substantially the same configuration as the main body, and engaging the removed annular seal to the replacement detail with an interference fit.

DETAILED DESCRIPTION

The present invention, in general, provides a method for use with annular gas turbine engine components, particularly components having a subcomponent—such as a seal—attached to a main body with an interference fit. The method of the present invention can include rotating the annular gas turbine engine component while directing thermal energy from a heat source (e.g., a plasma gun, torch, etc.) at an annular seal subcomponent to thermally expand an annular seal subcomponent, removing the heated annular seal from a main body of the annular gas turbine engine component, and engaging the removed annular seal to a newly manufactured replacement detail (having substantially the same configuration as the engine-run main body) with an interference fit. The annular seal subcomponent can be heated for a limited period of time, such as up to 30 or 90 seconds, such that thermal expansion is limited primarily to the annular seal subcomponent and tends not to affect the main body of the annular gas turbine engine component. This allows the annular seal subcomponent to be relatively easily removed (i.e., overcoming the interference fit) while reducing a chance of damage to the salvaged subcomponent. A cooling fluid can optionally be directed at the main body to facilitate this differential heating. The annular seal subcomponent is salvaged and reinstalled on a new replacement detail. To achieve serial number continuity throughout the process, a part serial number can be tracked through the salved annular seal subcomponent. The newly manufactured replacement detail can be marked or otherwise associated with a serial number that was originally associated with the now-scrapped main body of the engine-run annular gas turbine engine component from which the salvaged annular seal subcomponent was removed.

Figure 1:
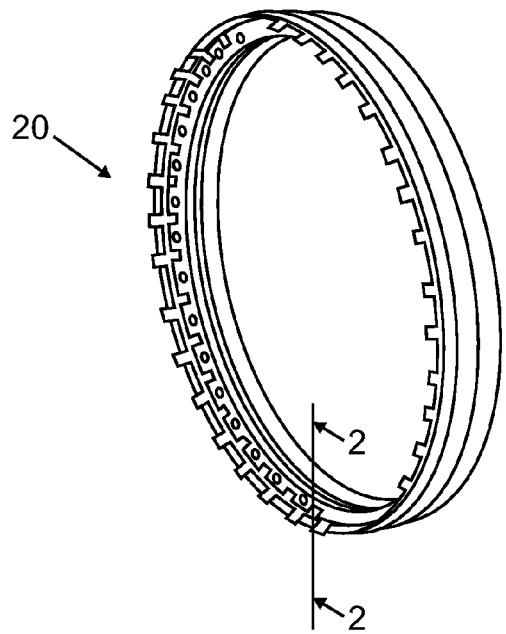
FIG. 1 is a perspective view of an annular gas turbine engine component.
Figure 2:
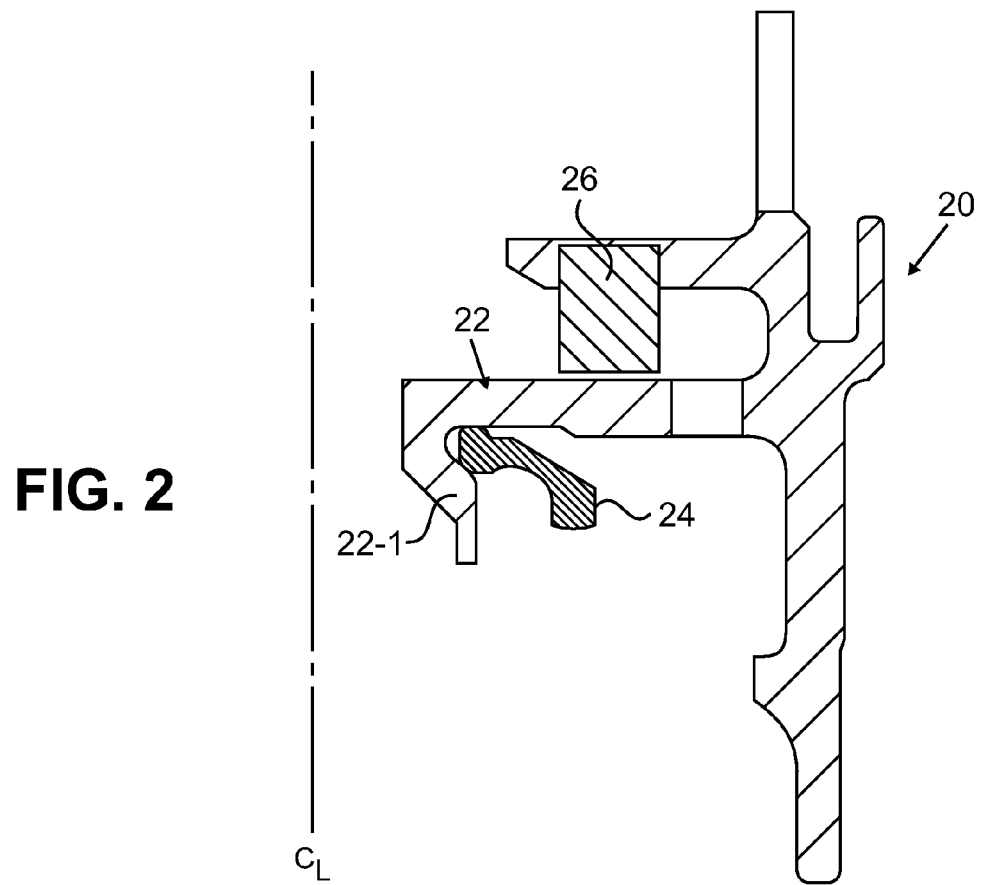
FIG. 2 is a cross-sectional view of the annular gas turbine engine component of FIG. 1, taken along line 2-2 of FIG. 1.

FIG. 1 is a perspective view of an annular gas turbine engine component 20, and FIG. 2 is a cross-sectional view of the annular gas turbine engine component 20, taken along line 2-2 of FIG. 1. A centerline $C_L$ is shown in FIG. 2 for illustrative purposes, though the spacing of the centerline $C_L$ to the annular component 20 may not be shown to scale. In the illustrated embodiment, the component 20 is a high pressure turbine (HPT) first stage vane support for a PW4000 series gas turbine engine (available from Pratt & Whitney, East Hartford, Conn., USA). The component 20 includes a main body 22 and an annular dog-bone seal subcomponent 24. Retaining pins 26 can also be provided. As shown in FIG. 2, the annular seal 24 is engaged to a flange portion 22-1 of the main body 22 with an interference fit, such that the annular seal 24 is radially and axially retained by the main body 22. A configuration of the flange portion 22-1 can further radially (or axially) capture the annular seal 24.

After use in a gas turbine engine (not shown), the engine-run annular gas turbine engine component 20 may become worn or damaged. Examples of typical wear and damage include cracking along various portions of the main body 22. Known repairs for such cracking include welding, brazing, blending and plating. However, in some situations, such known repairs may be too complex, expensive, environmentally unfriendly, or difficult to perform satisfactorily. Moreover, because many known repair processes involve material removal and replacement, there are limits to the number of times some of these known repairs can be performed before repairable limits are reached or exceeded.

A repair of the annular gas turbine engine component 20 can include removing the annular seal 24 from the main body 22, salvaging the removed annular seal 24, scrapping the main body 22, and engaging the salvaged annular seal 24 to a newly manufactured replacement detail that takes the place of the (scrapped) engine-run main body 22. Details of this method are explained below.

Figure 3:
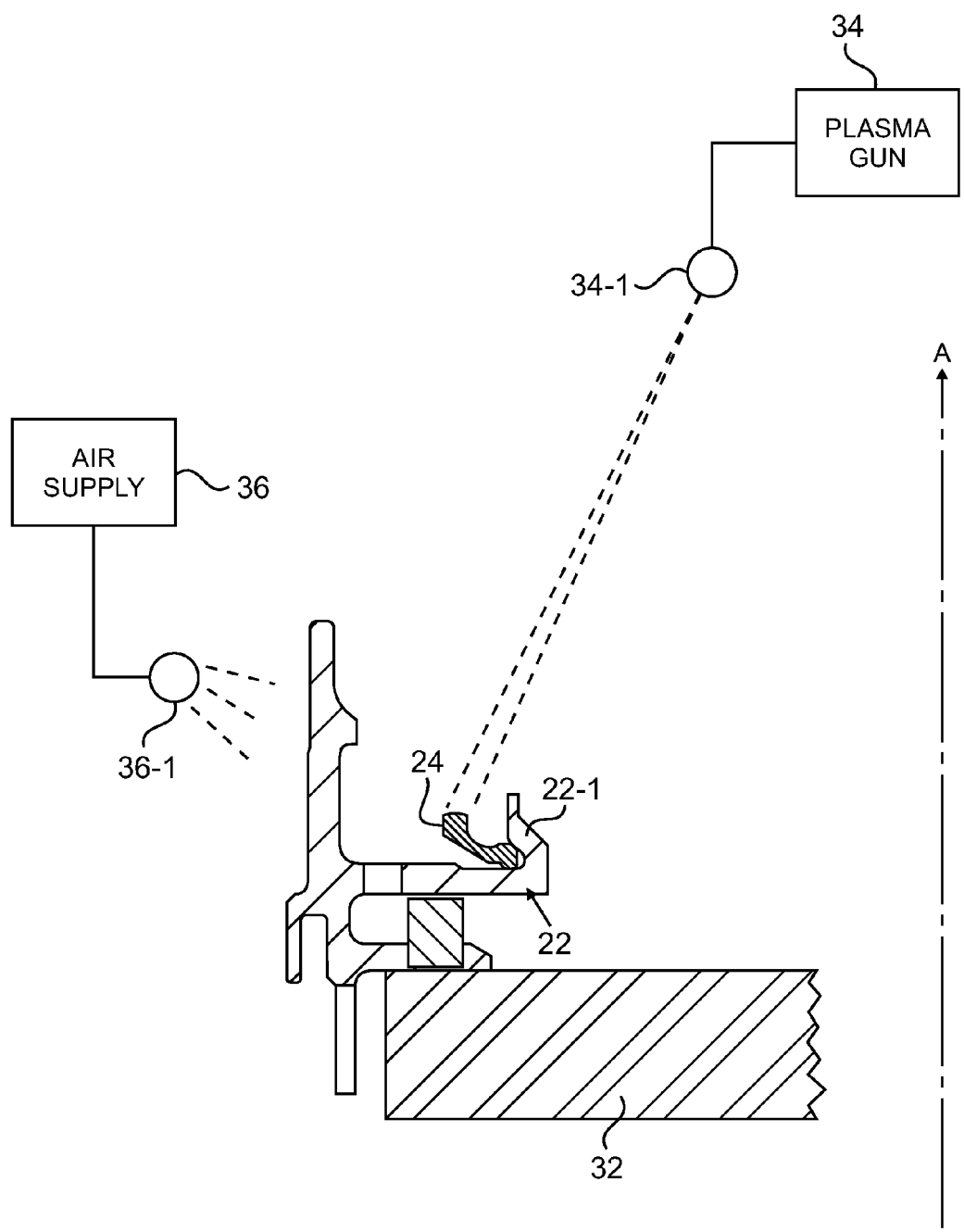
FIG. 3 is cross-sectional view of a heating assembly.

FIG. 3 is cross-sectional view of a heating assembly that includes a rotary table 32, a plasma gun 34, and an optional air supply 36. In the illustrated embodiment, the annular gas turbine engine component 20 is placed on the rotary table 32 for rotation therewith about an axis A. The centerline $C_L$ of the component 20 can be aligned with the axis A. Suitable exhaust venting (not shown) can be provided to exhaust thermal energy from an area in which the heating assembly is located, such as an enclosed chamber or room.

The plasma gun 34 can be of a conventional type used for the application of coatings, and includes a nozzle 34-1, which can be integral with a remainder of the plasma gun 34. A material feeder of the plasma gun 34 conventionally used to supply coating material delivered by the nozzle 34-1 can be empty or disconnected, such that the plasma gun merely emits thermal energy from the nozzle 34-1. Plasma guns are capable of producing temperatures of approximately 16,649-19,427° C. (30,000-35,000° F.) in a plasma stream. The particular temperatures produced by the plasma gun 34 can vary as desired for particular applications. It should be noted that in alternative embodiments, a heat source other than a plasma gun can be utilized, such as a torch. The nozzle 34-1 can be directed to focus thermal energy from the plasma gun 34 at the annular seal 24, while reducing the amount of thermal energy directed at the main body 22 of the annular gas turbine engine component 20. In one embodiment, a stand-off distance between the nozzle 34-1 and a seal face of the annular seal 24 is approximately 3.175 cm (1.25 inches). Focused thermal energy from the plasma gun 34 allows a temperature of the annular seal 24 to be rapidly elevated above that of the main body 22. In the illustrated embodiment, the plasma gun 34 is positioned near the axis A, though other arrangements are possible, such as locating the plasma gun 34 across the and beyond the axis A.

The air supply 36 includes a nozzle 36-1, which can be integral with a remainder of the air supply 36. In one embodiment, the air supply delivers ambient or normal room temperature air through the nozzle 36-1 using a suitable blower, fan, etc. In further embodiments, the air supply 36 could deliver air that has been cooled below ambient temperature. The nozzle 36-1 directs air at the main body 22 of the annular gas turbine engine component 20. Positioning of the nozzle 36-1 can vary as desired for particular applications. Air from the air supply 36 helps to keep the main body 22 relatively cool, to help prevent thermal energy from the plasma gun 34 from causing thermal expansion of the main body 22.

Figure 4:
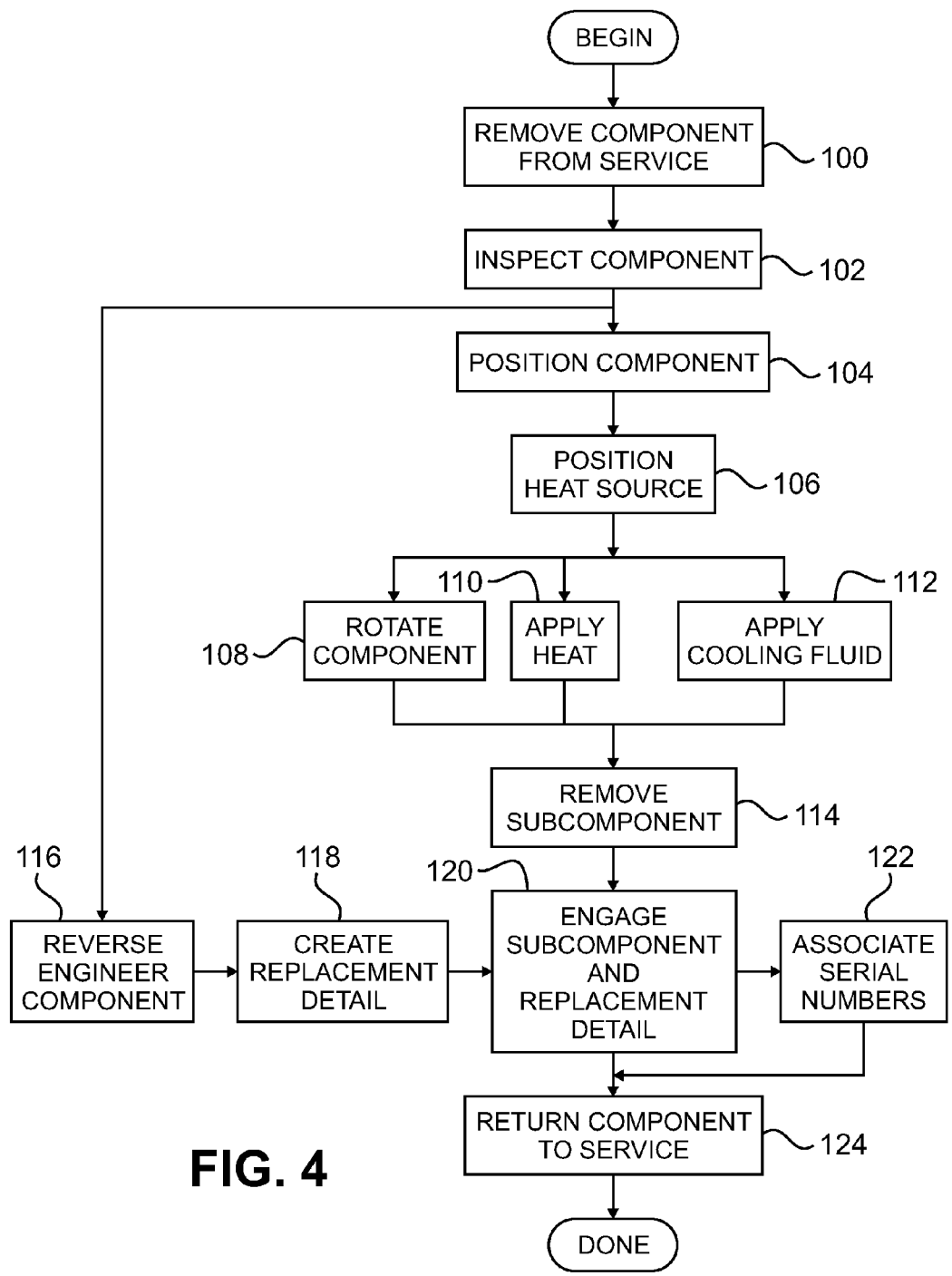
FIG. 4 is a flow chart of a method of the present invention.

FIG. 4 is a flow chart of a method for repairing the annular gas turbine engine component 20. Initially, the component 20 is removed from service (step 100), that is, the component 20 is removed from a gas turbine engine after being used. The engine-run component 20 is then inspected using suitable techniques (step 102), such as fluorescent penetrant inspection (FPI), to identify wear and/or damage, such as cracks.

After damage or wear sufficient to warrant repair has been identified, the component 20 is positioned on the rotary table 32 (step 104). A heat source (such as the plasma gun 34) is positioned relative to the component 20 (step 106). The component 20 is rotated by the rotary table 32 (step 108). Simultaneously, that is, while the component 20 is rotating, heat (i.e., thermal energy) is applied in a focused manner to the annular seal subcomponent 24 (step 110), and a cooling fluid (e.g., air at ambient temperature) is optionally applied to the main body 22 of the component 20 (step 112). At step 110, the annular seal subcomponent 24 can be heated to at least approximately 343° C. (650° F.). Heating the subcomponent 24 at step 110 is performed for up to approximately 90 seconds, and preferably for up to approximately 30 seconds. Additional heating time could undesirably increase a risk of thermally expanding the main body 22 of the component 20. In further embodiments, other temperature and/or heating time can be set as desired for particular applications. Focused heating of the annular seal subcomponent 24 while it is rotating allows for differential heating of the subcomponent 24 relative to the main body 22, such that the subcomponent 24 rapidly thermally expands relative to the main body 22. Rotation allows relatively even heating about an entire circumference of the subcomponent 24. In one embodiment, the rotary table 32 rotates the component 20 at approximately 20 revolutions per minute (RPM). Rotation speed can vary as desired, with faster rotational speeds tending to produce more even heating while also potentially lengthening a total amount of time required to sufficiently elevate the temperature of the annular seal subcomponent 24. The heated annular seal subcomponent 24 is then removed from the main body 22 (step 114). After rapid heating to approximately 343° C. (650° F.) or more, the subcomponent 24 can be relatively easily snapped out of the main body 22, overcoming the interference fit therebetween without damage. The subcomponent 24 is salvaged for reuse, and the engine-run main body can be scrapped. A serial number associated with the component 20, including the main body 22, is tracked by way of the salvaged subcomponent 24.

If details of the original design configuration of the engine-run main body 22 of the annular gas turbine engine component 20 are unknown, the component 20—or a physically different part of the same configuration—can be reverse engineered (step 116). If blueprint specifications of the engine-run main body 22 are known, then the serial number hose specifications can be utilized and reverse engineering omitted. A newly-manufactured replacement detail is created (step 118) that can have a configuration substantially similar to that of the engine-run main body 22, with such variations as necessary and desired to correct and compensate for undesirable wear and/or damage to the engine-run main body 22.

The salvaged (i.e., engine-run) annular seal subcomponent 24 is engaged with the newly manufactured (i.e., non-engine-run) replacement detail (step 120). In one embodiment, the salvaged annular seal subcomponent 24 is heated in a conventional industrial oven, and then positioned relative of the replacement detail, which is not heated to an elevated temperature, and, upon cooling of the subcomponent 24, an interference fit with the replacement detail is formed. The serial number associated with the engine-run component 20, including the scrapped, engine-run main body 22 and the salvaged, engine-run subcomponent 24, is associated with the newly manufactured replacement detail (step 122). This can include marking the newly manufactured replacement detail with the serial number tracked by way of the salved subcomponent 24. The finished component, which includes the newly manufactured replacement detail, is then returned to service (step 124).

Those of ordinary skill in the art will recognize that the present invention provides numerous advantages and benefits. For example, focused application of thermal energy with a plasma gun, torch or the like to heat a rotating annular subcomponent for a limited period of time allows for removal of that subcomponent and the overcoming of an interference fit without damage to the subcomponent. While other methods may appear available for removing the subcomponent, like cutting apart a main body of a component with a machining process to release the subcomponent, such approaches are time consuming, burdensome and present a risk to the subcomponent of inadvertent damage or destruction. Moreover, conventional heating in a an industrial oven will not allow for removal of the subcomponent form the main body, because heating of both the subcomponent and the main body will cause both to thermally expand without allowing the interference fit between them to be overcome.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s)

disclosed, but that the invention will include all embodiments falling within the scope of the appended claims. For example, the present invention can be utilized with annular components of a variety of configurations. Moreover, the method of the present invention can be utilized in conjunction with other methods or steps not specifically discussed.

The invention claimed is:

1. A method for use with an annular gas turbine engine component that includes a main body and an annular seal engaged to the main body with an interference fit, the method comprising:
    rotating the annular gas turbine engine component;
    directing thermal energy from a heat source at the annular seal to thermally expand the annular seal relative to the main body while the annular gas turbine engine component rotates;
    removing the heated annular seal from the main body;
    providing a newly manufactured replacement detail having substantially the same configuration as the main body; and
    engaging the removed annular seal to the replacement detail with an interference fit.

2. The method of claim 1, wherein the heat source is a plasma gun having an empty or disconnected material feeder, wherein a nozzle of the plasma gun is positioned relative to the annular seal at a stand-off distance of approximately 3.175 cm (1.25 inches), wherein the plasma gun generates a stream of thermal energy at approximately 16,649-19,427° C. (30,000-35,000° F.), and wherein the annular gas turbine engine component is rotated at approximately 20 RPM.

3. The method of claim 1, wherein the step of directing thermal energy from a heat source at the annular seal is conducted for no more than 90 seconds.

4. The method of claim 1, wherein the step of directing thermal energy from a heat source at the annular seal is conducted for no more than 30 seconds.

5. The method of claim 1, wherein the annular seal is heated to at least approximately 343° C. (650° F.).

6. The method of claim 1 and further comprising:
    directing a cooling fluid at the main body while thermal energy from the heat source is directed at the annular seal.

7. The method of claim 6, wherein the cooling fluid comprises air at ambient temperature.

8. The method of claim 1 and further comprising:
    associating the newly manufactured replacement detail with a serial number associated with the main body of the annular gas turbine engine component from which the annular seal was removed.

9. The method of claim 1 and further comprising:
    inspecting the annular gas turbine engine component for damage, wherein the annular gas turbine engine component has previously been in service in a gas turbine engine.

10. The method of claim 9, wherein the step of inspecting the annular gas turbine engine component for damage comprises fluorescent penetrant inspection.

11. The method of claim 1 and further comprising:
    installing the annular gas turbine engine component in a gas turbine engine.

12. The method of claim 1 and further comprising:
    placing the annular gas turbine engine component on a rotary table.

13. A method for use with an annular gas turbine engine component that includes a main body and an annular seal engaged to the main body with an interference fit, the method comprising:
    rotating the annular gas turbine engine component on a rotary table;
    directing thermal energy from a heat source at the annular seal for up to approximately 90 seconds while the annular gas turbine engine component rotates;
    removing the heated annular seal from the main body;
    providing a newly manufactured replacement detail having substantially the same configuration as the main body; and
    engaging the removed annular seal to the replacement detail with an interference fit.

14. The method of claim 13, wherein the heat source is a plasma gun having an empty or disconnected material feeder.

15. The method of claim 13, wherein the step of directing thermal energy from a heat source at the annular seal is conducted for no more than 30 seconds.

16. The method of claim 13, wherein the annular seal is heated to at least approximately 343° C. (650° F.).

17. The method of claim 13 and further comprising:
    directing cooling air at ambient temperature at the main body while thermal energy from the heat source is directed at the annular seal.

18. The method of claim 13 and further comprising:
    associating the newly manufactured replacement detail with a serial number associated with the main body of the annular gas turbine engine component from which the annular seal was removed.

19. The method of claim 13 and further comprising:
    inspecting the annular gas turbine engine component for damage using fluorescent penetrant inspection.

20. A method for use with an annular gas turbine engine component that includes a main body and an annular seal engaged to the main body with an interference fit, the method comprising:
    placing the annular gas turbine engine component on a rotary platform;
    rotating the annular gas turbine engine component on the rotary platform;
    directing thermal energy from a heat source at the annular seal for up to approximately 90 seconds while the annular gas turbine engine component rotates, wherein the thermal energy is focused at the annular seal, and wherein the annular seal is heated to at least approximately 343° C. (650° F.);
    directing cooling air at ambient temperature at the main body while thermal energy from the heat source is directed at the annular seal;
    removing the heated annular seal from the main body;
    providing a newly manufactured replacement detail having substantially the same configuration as the main body;
    engaging the removed annular seal to the replacement detail with an interference fit; and
    associating the newly manufactured replacement detail with a serial number associated with the main body of the annular gas turbine engine component from which the annular seal was removed.

* * * * *